(12) United States Patent
Zhang et al.

(10) Patent No.: US 8,812,004 B2
(45) Date of Patent: Aug. 19, 2014

(54) METHOD FOR HANDLING CALL CONFLICTS IN A COMMUNICATION NETWORK AND APPARATUS THEREOF

(75) Inventors: Zhuo Zhang, Shanghai (CN); Xiaobo Jia, Shanghai (CN)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/260,639

(22) PCT Filed: Mar. 31, 2009

(86) PCT No.: PCT/CN2009/071100
§ 371 (c)(1),
(2), (4) Date: Sep. 27, 2011

(87) PCT Pub. No.: WO2010/111830
PCT Pub. Date: Oct. 7, 2010

(65) Prior Publication Data
US 2012/0021751 A1    Jan. 26, 2012

(51) Int. Cl.
*H04W 40/00* (2009.01)
*H04M 3/00* (2006.01)
*H04M 3/42* (2006.01)

(52) U.S. Cl.
USPC .................. 455/445; 455/418; 379/215.01

(58) Field of Classification Search
USPC .............................. 455/445, 418; 379/215.01
See application file for complete search history.

(56) References Cited

U.S. PATENT DOCUMENTS

| | | | |
|---|---|---|---|
| 2006/0160531 A1 | 7/2006 | Park et al. | |
| 2007/0121831 A1* | 5/2007 | Kim et al. | 379/93.31 |
| 2008/0279358 A1* | 11/2008 | Kim et al. | 379/208.01 |

FOREIGN PATENT DOCUMENTS

| | | |
|---|---|---|
| CN | 101155389 A | 4/2008 |
| JP | 62-155695 A | 7/1987 |
| JP | 2005-136735 A | 5/2005 |

OTHER PUBLICATIONS

International Search Report for PCT/CN2009/071100 dated Jan. 7, 2010.

* cited by examiner

*Primary Examiner* — Omoniyi Obayanju
(74) *Attorney, Agent, or Firm* — Fay Sharpe LLP

(57) ABSTRACT

The present invention provides a method for handling a call conflict at a call processing apparatus in a communication network, said call processing apparatus comprising a first call processing element which handles a first call initiated by a first terminal and a second call processing element which handles a second call initiated by a second terminal, when said second call processing element receives an incall message initiated by said first terminal and directed to communicate with said second terminal while said second terminal is in busy state, the method comprising: inquiring the called number in the call record of said second terminal; comparing initiating times of said first call and said second call, if said called number in said call record of said second terminal is the number of said first terminal contained in said incall message; and releasing the call with later initiating time and continuing setting up of the call with earlier initiating time, based on result of the comparison. Corresponding call processing apparatus and program product are also disclosed.

13 Claims, 3 Drawing Sheets

100

METHOD FOR HANDLING CALL CONFLICTS IN A COMMUNICATION NETWORK AND APPARATUS THEREOF

TECHNICAL FIELD OF THE INVENTION

The invention relates to the field of wireless communication, in particular, to a method and related apparatus for automatically setting up connection in case a call conflict occurs between two terminals.

BACKGROUND OF THE INVENTION

In wireless network such as CDMA, GSM, GPRS, CDMA2000, WDCMA(UMTS), TD-SCDMA and WiMAX etc, when terminal A is calling terminal B and at the same time terminal B is calling terminal A, the network will check A and B's status and inform the respective calling party that the called party is busy, thus the call will not be setup successfully. To a certain extent, this will reduce call success rates and waste network resources.

SUMMARY OF THE INVENTION

The object of the invention is to solve the problem that communication link can not be setup when a call conflict occurs in prior art. In current wireless network, when a call is calling in, the calling number and called number can be obtained from an INCALL message. For a call termination end, the calling number and called number can be obtained according to call record. Thus, when a call conflict occurs, according to basic idea of the present invention, the calling number and called number of both parties can be compared. If calling number of terminal A equals to called number of terminal B, and at the same time, calling number of terminal B equals to called number of terminal A, then continue to setup call path and connect the call between the two terminals.

An embodiment of the invention provides a method for handling a call conflict at a call processing apparatus in a communication network, said call processing apparatus comprising a first call processing element which handles a first call initiated by a first terminal and a second call processing element which handles a second call initiated by a second terminal, when said second call processing element receives an incall message initiated by said first terminal and directed to communicate with said second terminal while said second terminal is in busy state, the method comprising: inquiring the called number in the call record of said second terminal; comparing initiating times of said first call and said second call, if said called number in said call record of said second terminal is the number of said first terminal contained in said incall message; and releasing the call with later initiating time and continuing setting up of the call with earlier initiating time, based on result of the comparison.

In an embodiment according to the method of the invention, comprising: before comparing initiating times of said first call and said second call, accessing said first call element by said second call element to acquire initiating time of said first call, and performing comparison of call initiating times by said second call element.

In another embodiment according to the method of the invention, comprising: before comparing initiating times of said first call and said second call, sending a negotiation message containing initiating time of said second call and the called number to said first call element by said second call element, and performing comparison of call initiating times by said first call element.

In another embodiment according to the method of the invention, further comprising: comparing initiating times of said first call and said second call and recording comparison result after said first call element receives said negotiation message.

In another embodiment according to the method of the invention, further comprising: sending a response message containing the comparison result to said second call element by said first call element.

According to an embodiment of the method of the invention, preferably comprising: assigning a negotiation indicating bit to each call.

In another aspect, an embodiment of the invention provides a call processing apparatus for handling a call conflict in a communication network, said call processing apparatus comprising a first call processing element which handles a first call initiated by a first terminal and a second call processing element which handles a second call initiated by a second terminal, when said second call processing element receives an incall message initiated by said first terminal and directed to communicate said second terminal while said second terminal is in busy state, the call processing apparatus comprising: an inquiring means for inquiring the called number in the call record of said second terminal; a comparing means for comparing initiating times of said first call and said second call, if said called number in said call record of said second terminal is the number of said first terminal contained in said incall message; and an implementing means for releasing the call with later initiating time and continuing setting up of the call with earlier initiating time, based on result of the comparison.

The call processing apparatus according to an embodiment of the invention comprising means for, before comparing initiating times of said first call and said second call, accessing said first call element to acquire initiating time of said first call.

The call processing apparatus according to another embodiment of the invention comprising means for, before comparing initiating times of said first call and said second call, sending a negotiation message containing initiating time of said second call and the called number.

The call processing apparatus according to another embodiment of the invention further comprising means for comparing initiating times of said first call and said second call and recording comparison result after receiving said negotiation message.

The call processing apparatus according to another embodiment of the invention further comprising means for sending a response message containing the comparison result to said second call element.

The invention also relates to a program product for handling a call conflict at a call processing apparatus in a communication network, said call processing apparatus comprising a first call processing element which handles a first call initiated by a first terminal and a second call processing element which handles a second call initiated by a second terminal, when said second call processing element receives an incall message initiated by said first terminal and directed to communicate said second terminal while said second terminal is in busy state, the program product comprising program codes for carrying steps of: inquiring the called number in the call record of said second terminal; comparing initiating times of said first call and said second call, if said called number in said call record of said second terminal is the number of said first terminal contained in said incall message; and releasing the call with later initiating time and continuing setting up of the call with earlier initiating time, based on result of the comparison.

BRIEF DESCRIPTION OF THE DRAWINGS

Other objects and advantages of the invention will become more apparent from the following description taken in conjunction with accompany drawings, in which.

DETAILED DESCRIPTION OF THE PREFERRED EMBODIMENTS

Figure 1:
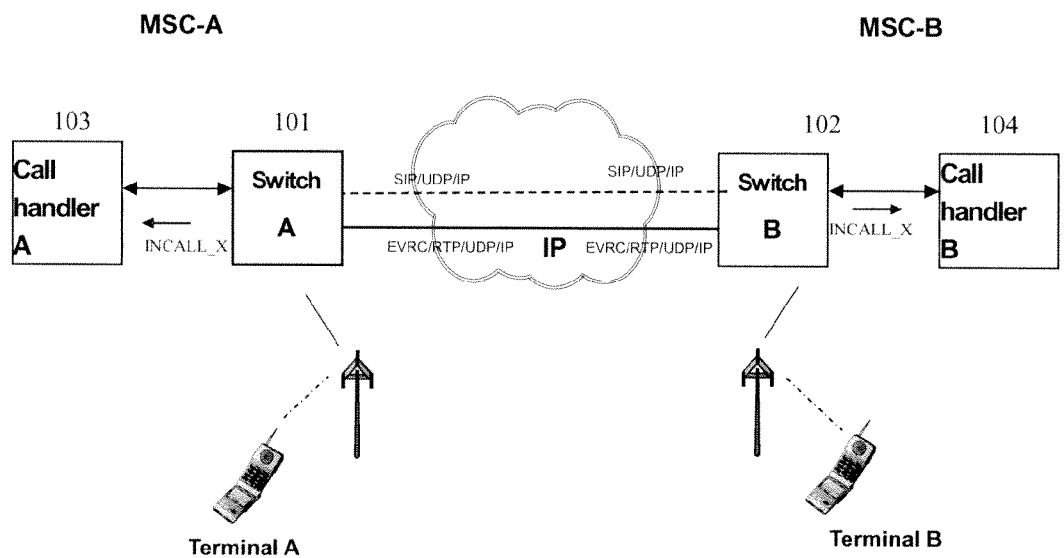
FIG. 1 is a diagram that schematically shows a communication network in which the present invention is applied.

FIG. 1 is a diagram that schematically shows a communication network 100 in which the present invention is applied. FIG. 1 shows an IP core network and two mobile switching centers at different mobile switching centers MSC-A and MSC-B. It is to be noted that, although the mechanism of the invention is explained in embodiments of the invention by taking CDMA for example, those skilled in the art should appreciate that, basic principle of the invention is fully applicable to other types of wireless network such as GSM, GPRS etc. At MSC-A and MSC-B side, terminals A and B access network via base stations or other access points respectively. In this communication network, call handlers 103 and 104 are core control apparatuses and are used to control all functions such as call processing, user data query etc. Switches 101 and 102 control main bear paths and are responsible for call resources acquisition and setup of bear path based on instruction of corresponding call handler.

In a current wireless network, if terminal A calls terminal B, then a call record will be generated at the call processing apparatus's side for handling terminal A's call, the call record includes number of calling party A and number of called party B, in this description, the call processing apparatus side is referred to as "call processing element A", of course, the call processing element A has corresponding storage therein for storing call record of terminal A. Similarly, if terminal B calls terminal A, then a call record will be generated at the call processing apparatus's side for handling terminal B's call, the call record includes number of calling party B and number of called party A, the call processing apparatus side is referred to as "call processing element B", of course, the call processing element B has corresponding storage therein for storing call record of terminal B. The generated INCALL message includes number of calling party and called party.

In an embodiment of the invention, an auto-connection mechanism is designed for a call conflict that may occur between two terminals. Whether two parties are calling each other may be determined by comparing numbers of calling party and called party of the call record and INCALL message. Therefore, what is important is how to determine that a call initiated by one party should be released and a call initiated by one party should be hold and finally setup. An embodiment of the invention has proposed to compare call initiating time of two parties. For example, a call with earlier initiating time may be hold and continue to be setup while a call with later initiating time may be cleared, based on timestamp in the call record.

Figure 2:
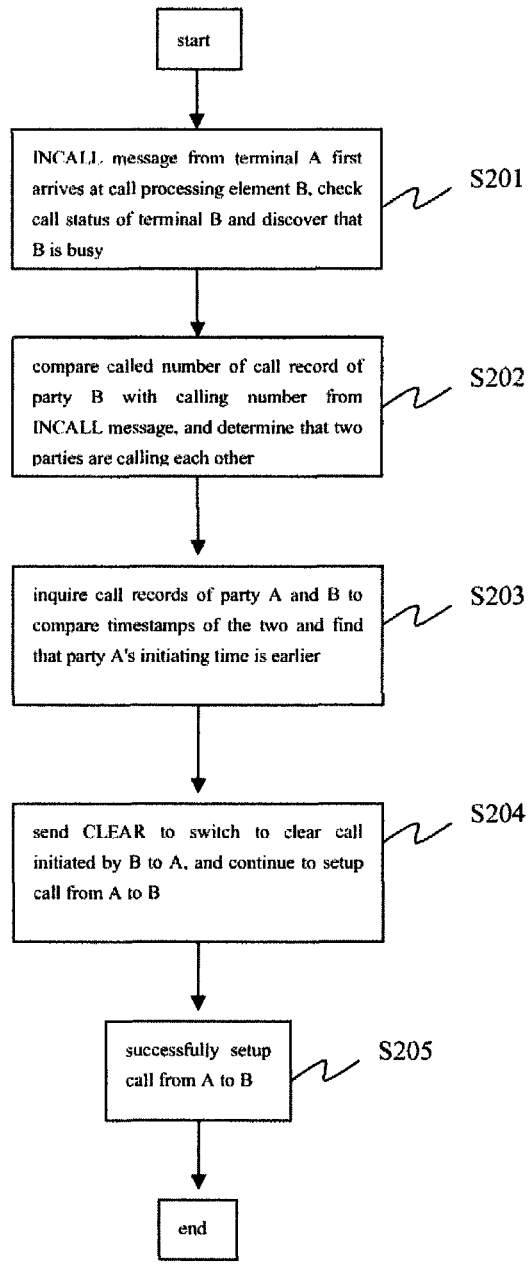
FIG. 2 is a flowchart that illustratively shows an embodiment according to the present invention.

The flowchart in FIG. 2 illustratively shows an embodiment according to the present invention. In this embodiment, two terminals, for example terminal A and terminal B, are under control of a same call handler, that is, the two terminals are local users administrated by a same Mobile Switching Center. In FIG. 1, assume that both terminal A and terminal B are under administration of MSC-A, then in this case, functions of terminal A and terminal B such as call processing, user data query etc. are all implemented by call handler 103. As mentioned above, to make the description more clear, in call processing apparatus 103, the logical entity that handles call from terminal A is referred to as "call processing element A" and the logical entity that handles call from terminal B is referred to as "call processing element B".

In FIG. 2, as shown at step S201, assume that an INCALL message from terminal A first arrives at call processing element B of call handler 103, then call processing element B learns call status of terminal B by inquiring stored call record of terminal B and finds that terminal B is busy. In prior mechanism, call processing element B will directly play busy tone to terminal A, thus the call between terminal A and B can not be successfully setup.

In the auto-connection mechanism of the present invention, as shown at step S202, call processing element B compares called number of call record of party B with calling number from the INCALL message, if they are the same, then it is determined that the two parties are calling each other. Next, at step S203, call processing element B acquires call initiating time of terminal A by accessing call record stored in call processing element A, for example, so as to compare call initiating time of terminal A with call initiating time in call record of terminal B.

Typically, for those skilled in the art, call initiating time may be acquired by checking timestamps. Assume that through comparison of timestamps, call initiating time of terminal A is earlier than call initiating time of terminal B. Then, according to the comparison result in step S203, since timestamp in call record of A is earlier than timestamp in call record of B, call processing element B will send a CLEAR message to the switch to clear the call to A initiated by B and continue to setup call from A to B. Preferably, even if call of B is just initiated and has not arrived at call processing element A yet, CLEAR still needs to be sent to terminal A, the purpose of which is to clear resource that has been allocated. It is to be noted that, call processing element B sends a CLEAR message to the switch which delivers that message via signaling to the switch at user A's side, and then informs call processing element A via a HANGUP message. By the way, the transition from CLEAR message to HANGUP message belongs to common knowledge in the art, detailed description of which will not be given in embodiments of the invention so as to not obscure the invention.

At call processing element A's side, after the INCALL message from terminal B arrives, call processing element A performs the above described number comparison process and inquires that timestamp of party A is earlier than party B, then the INCALL message from B to A will be hung up, to wait for HANGUP message from call processing element B to clear the call from B to A. Here, the reason to consider waiting for HANGUP message from call processing element B is that, generally, as is known to those skilled in the art, the INCALL message usually arrives at call processing element A earlier than HANGUP message. Next, as shown at step S205, the situation in which two parties A and B call simultaneously will be transformed into A calling B, the call between A and B will be successfully setup.

Figure 3:
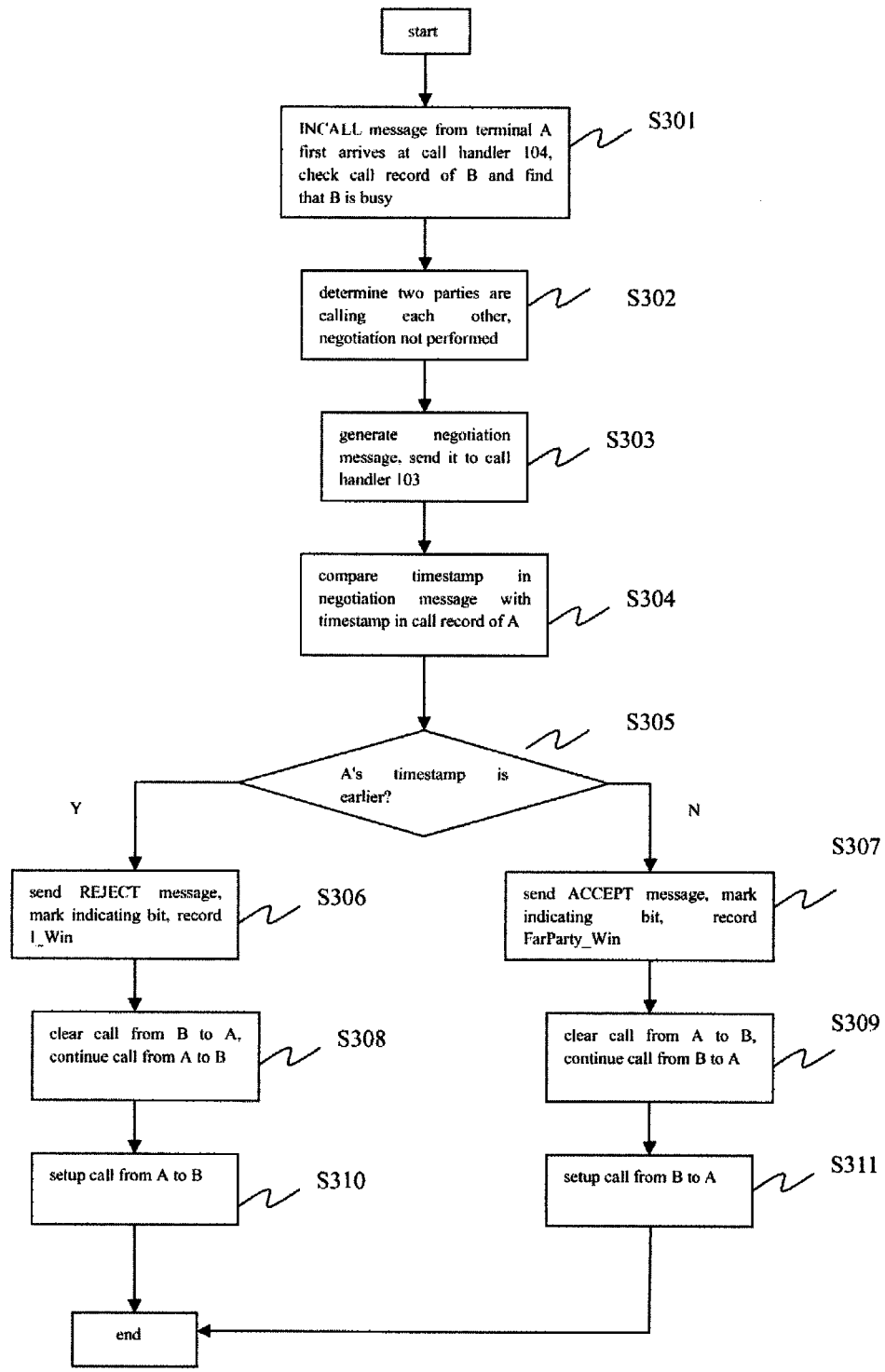
FIG. 3 is a flowchart that shows a method according to an embodiment of the present invention.

FIG. 3 is a flowchart that illustratively shows another embodiment according to the invention.

In this scenario, two terminals, for example, terminal A and terminal B, are under control of different call handlers 103, 104 respectively, that is, the situation shown in FIG. 1. Functions of terminal A such as call processing, user data query etc are implemented by call handler 103, and functions of terminal B such as call processing, user data query etc are implemented by call handler 104. As is known to those skilled in the art, call handler 103, 104 respectively comprise functional entity that handles call in, call out in different directions, however, in this embodiment, actually only call processing entity A of call handler 103 that handles call in of terminal A and call processing entity B of call handler 104 that handles call in of terminal B are considered.

In FIG. 3, as shown as step S301, assume that an INCALL message from terminal A first arrives at call handler 104, then call handler 104 inquires call status of terminal B and finds that terminal B is busy. As shown at step S302, call handler 104 compares called number of call record of party B with calling number of INCALL message from A, it is determined that the two parties are calling each other if it is found that the two numbers are the same.

Next, in the auto-connection mechanism of the present invention, negotiation needs to be performed between call handler 103 that administrates terminal A and call handler 104 that administrate terminal B to determine which call should be hold and release another call. According to a preferred embodiment of the invention, a negotiation indicating bit may be preset to indicate whether negotiation has been performed by call handler corresponding to the terminals. Preferably, in an embodiment according to the invention, one such negotiation indicating bit is assigned to each initiated call. By the way, even in case that multiple calls are initiated simultaneously, assignment of negotiation indicating bit will not bring problem in resource allocation. The default value of that indicating bit is "No" (e.g., represented by "0"), and once negotiation has been performed, corresponding call handler can rewrite that indicating bit as "Yes" (e.g., represented by "1").

Thus, it is found that terminal A and terminal B are calling each other and these two terminals are administrated by different call handlers. Negotiation indicating bit is checked on call handler 104 where INCALL message arrives, the default value of that indicating bit is "No", meaning that negotiation has not been performed for this call conflict yet (namely, step S302).

Next, at step S303, call handler 104 sends a new ANSI-41 (ANSI=American National Standards Institute) message (referred to hereinafter as connection negotiation message) to call handler 103 that administrates terminal A. The purpose of that message is negotiation and contention of auto-connection, thus, the connection negotiation message should include timestamp of call record of party B and number of party A (namely, called number for party B). After call handler 103 receives this connection negotiation message, it learns that party B wants to perform negotiation on auto-connection. Therefore, call handler 103 inquires timestamp of call record from A to B according to user number of party A contained in the connection negotiation message, namely, step S304.

There may be two different results in timestamp comparison in step S304, one is that the timestamp of call record of terminal A is earlier than the timestamp contained in connection negotiation message (namely, timestamp of terminal B initiating the call), this means that time of the call initiated by party A to B is earlier than time of the call initiated by party B to A, which is shown by the "Y" branch of step S305.

Therefore, call handler 103 will send a REJECT message to call handler 104 and mark negotiation indicating bit in call record of terminal A as "Y", then record a new negotiation result field in call record of terminal A, for example, the field may be recorded as "I_Win", as shown at step S306.

After call handler 104 at side B receives that REJECT message, it starts to clear call from B to A and continue to setup INCALL (from A to B) call. The method of clearing call from B to A is known to a person skilled in the art, it may comprise: call handler 104 sends a HANGUP message to switch, the switch sends that message out of office via signaling to a switch at office of user A, the switch at that office converts that message into REMOTE HANGUP (or "HANG-OFF") message and send it to call processing element 103.

When the INCALL message from B to A arrives call handler 103 at side A, call handler 103 learns that A and B are calling each other according to the INCALL message and call record of A, it will check negotiation indicating bit in call record of party A and finds that the indicating bit is "Yes", meaning that negotiation directed to the present call conflict is finished, and there is no need to perform negotiation again. Then, call handler 103 will check negotiation result field. As mentioned above, the negotiation result field has been marked as "I_Win", thus, call handler 103 does not continue to handle that INCALL message, rather, it waits HANGUP message from B to A to release that call, as shown at step S308. Therefore, the call from B to A is released and the call from A to B is successfully setup (step S310).

Of course, timestamp comparison in step S304 may also has such result, that is, timestamp of call record of terminal A is later than the timestamp contained in connection negotiation message (namely, timestamp of terminal B initiating the call), this means that time of the call initiated by party A to B is later than time of the call initiated by party B to A, which is shown by the "No" branch of step S305.

Therefore, call handler 103 will send an ACCEPT message to call handler 104 and mark negotiation indicating bit in call record of terminal A as "Yes", then record a new negotiation result field in call record of terminal A, for example, the field may be recorded as "FarParty_Win", as shown at step S307.

Next, in step S309, call handler 109 starts to send a CLEAR message to clear call from A to B. Similarly, call processing element 103 at side of user A sends a CLEAR message to switch, the switch sends that message out of office via signaling to a switch at office of user B, the switch at that office converts that message into REMOTE HANGUP message and send it to call processing element 104 at side of user B.

After call handler 104 at side B receives that ACCEPT message, it learns that its own side goes ahead in the call and it will no longer handle the INCALL from A to B, but just wait HANGUP from A to B to release that call. When the INCALL message from B to A arrives at call handler 103 at side A, call handler 103 learns that A and B are calling each other according to the INCALL message and call record of A, and that call handlers that administrate A and B are different call handlers. Call handler 103 will check negotiation indicating bit in call record of party A and finds that the indicating bit is "Yes", meaning that negotiation directed to the present call conflict is finished, and there is no need to perform negotiation again. Then, call handler 103 will check negotiation result field. As mentioned above, the negotiation result field has been marked as "FarParty_Win", thus, call handler 103 will continue to handle INCALL message from B to A. After call from A to B has been released, call handler 103 will continue to deliver INCALL message from B to A. Then, as shown at step S311, the call from A to B is released and the call from B to A is successfully setup.

For a person skilled in the art, there is no special difficulty in manufacturing corresponding call handler according to embodiments of the method of the invention, functional architecture of call processing apparatus according to the invention will be briefly described in the following.

Corresponding to method embodiment of the invention, an embodiment of call processing apparatus of the invention preferably comprises means for performing corresponding steps:

inquiring means for inquiring the called number in the call record of corresponding terminal;

comparing means for comparing initiating times of the first call and the second call, if it is determined that terminal A and terminal B are calling each other; and implementing means for releasing the call with later initiating time and continuing setting up of the call with earlier initiating time, based on comparison result of call initiating time.

In a preferred embodiment according to the invention, the call processing apparatus comprises: means for, before comparing initiating times of the first call and the second call, accessing call element of the other party to acquire initiating time of the other end.

In another preferred embodiment according to the invention, the call processing apparatus comprises: means for, before comparing initiating times of two calls, sending a negotiation message containing initiating time of call of own party and called number; means for comparing initiating times of the two calls and recording comparison result after receiving said negotiation message; and means for sending a response message containing the comparison result to call element of the other party.

Although the invention has been described with specific examples comprising currently preferred mode for implementing the invention, those skilled in the art can recognize that, multiple variations and substitutions may be made to the above apparatus and method, and the variations and substitutions belong to spirit and scope of the invention as set forth in the

The invention claimed is:

1. A method for handling a call conflict in a communication network, the communication network including a first call handler which handles a first call initiated by a first terminal and a second call handler which handles a second call initiated by a second terminal, such that when the second call handler receives an incall message initiated by the first terminal it is directed to communicate with the second terminal while the second terminal is in a busy state, the method comprising:

inquiring the called number in the call record of the second terminal;

accessing the first call handler by the second call handler to acquire initiating time of the first call;

comparing initiating times of the first call and the second call, if the called number in the call record of the second terminal is the number of the first terminal contained in the incall message; and releasing the call with later initiating time and continuing setting up of the call with earlier initiating time, based on result of the comparison, wherein a negotiation bit indicating whether call handling has occurred is assigned to each initiated call, wherein, during call handling, if the first call handler, upon checking the negotiation bit in the call record of the first terminal, finds that negotiation has occurred, the first call handler will not perform negotiation, wherein, after negotiation is complete, a call handler will mark a negotiation result field to indicate which call was connected as a result of the negotiation.

2. The method of claim 1, comprising: before comparing initiating times of the first call and the second call, sending a negotiation message containing initiating time of the second call and the called number to the first call handler by the second call handler, and performing comparison of call initiating times by the first call handler.

3. The method of claim 2, further comprising: comparing initiating times of the first call and the second call and recording comparison result after the first call handler receives the negotiation message.

4. The method of claim 3, further comprising: sending a response message containing the comparison result to the second call handler by the first call handler.

5. The method of claim 1, further comprising: assigning a negotiation indicating bit to each call.

6. A first call handling apparatus and a second call handling apparatus for handling a call conflict in a communication network, the first call handling apparatus being operative to handle a first call initiated by a first terminal and the second call handling apparatus being operative to handle a second call initiated by a second terminal, such that when the second call handling apparatus receives an incall message initiated by the first terminal and directed to communicate with the second terminal while the second terminal is in a busy state, the first call handling apparatus and the second call handling apparatus being operative to:

inquire the called number in the call record of the second terminal;

access the first call handling apparatus by the second call handling apparatus to acquire initiating time of the first call;

compare initiating times of the first call and the second call, if the called number in the call record of the second terminal is the number of the first terminal contained in the incall message; and release the call with later initiating time and continue setting up of the call with earlier initiating time, based on result of the comparison, wherein a negotiation bit indicating whether call handling has occurred is assigned to each initiated call, wherein, during negotiation, if the first call handler, upon checking the negotiation bit in the call record of the first terminal, finds that negotiation has already occurred, the first call handler will not perform negotiation, wherein, after negotiation is complete, a call handler will mark a negotiation result field to indicate which call was connected as a result of the negotiation.

7. The first and second call handling apparatuses of claim 6, wherein the second call handling apparatus compares initiating times of the first call and the second call, sending a negotiation message containing initiating time of the second call and the called number.

8. The first and second call handling apparatuses of claim 7, wherein a processor is operative to compare initiating times of the first call and the second call and record comparison result after receiving the negotiation message.

9. The first and second call handling apparatuses of claim 8, wherein the first call handler sends a response message containing the comparison result to the second call processing element.

10. A method implemented by a non-transitory computer readable storage medium, in which a program is saved, the program comprising instructions which, when they are executed in a programmable device, cause a first call handling apparatus and a second call handling apparatus in a communication network to handle a call conflict, the first call handling apparatus being operative to handle a first call initiated by a first terminal and the second call handling apparatus being operative to handle a second call initiated by a second terminal, such that when the second call handling apparatus receives an incall message initiated by the first terminal it is directed to communicate with the second terminal while the second terminal is in a busy state, the computer program product comprising program codes for:

inquiring the called number in the call record of the second terminal;

accessing the first call handling apparatus by the second call handling apparatus to acquire initiating time of the first call;

comparing initiating times of the first call and the second call, if the called number in the call record of the second terminal is the number of the first terminal contained in the incall message; and releasing the call with later initiating time and continuing setting up of the call with earlier initiating time, based on result of the comparison, wherein a negotiation bit indicating whether call handling has occurred is assigned to each initiated call, wherein, during call handling, if the first call handler, upon checking the negotiation bit in the call record of the first terminal, finds that negotiation has already occurred, the first call handler will not perform negotiation, wherein, after negotiation is complete, a call handler will mark a negotiation result field to indicate which call was connected as a result of the negotiation.

11. The method of claim 1, wherein a negotiation bit value of "0", indicates call handling has not occurred, and a negotiation bit value of "1", indicates call handling has occurred.

12. The first and second call apparatuses of claim 6, wherein a negotiation bit value of "0", indicates call handling has not occurred, and a negotiation bit value of "1", indicates call handling has occurred.

13. The method of claim 10, wherein a negotiation bit value of "0", indicates call handling has not occurred, and a negotiation bit value of "1", indicates call handling has occurred.

* * * * *